(12) United States Patent  (10) Patent No.: US 11,776,113 B2
Qing et al.  (45) Date of Patent: Oct. 3, 2023

(54) POLARIZER ATTACHMENT DETECTION METHOD AND DEVICE, AND DISPLAY DEVICE

(71) Applicant: HKC CORPORATION LIMITED, Guangdong (CN)

(72) Inventors: Chun Qing, Guangdong (CN); Guoding Huang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 316 days.

(21) Appl. No.: 17/272,663

(22) PCT Filed: Dec. 6, 2019

(86) PCT No.: PCT/CN2019/123629
§ 371 (c)(1),
(2) Date: Mar. 2, 2021

(87) PCT Pub. No.: WO2020/134967
PCT Pub. Date: Jul. 2, 2020

(65) Prior Publication Data
US 2021/0201463 A1   Jul. 1, 2021

(30) Foreign Application Priority Data
Dec. 24, 2018 (CN) .......................... 201811588242.1

(51) Int. Cl.
*G06K 9/00* (2022.01)
*G06T 7/00* (2017.01)
(52) U.S. Cl.
CPC .... *G06T 7/001* (2013.01); *G06T 2207/20004* (2013.01); *G06T 2207/30121* (2013.01)

(58) Field of Classification Search
CPC .......... G06T 7/001; G06T 2207/20004; G06T 2207/30121; G02F 1/133528; G02F 1/1303
See application file for complete search history.

(56) References Cited

U.S. PATENT DOCUMENTS 9,816,939 B2 * 11/2017 Duffy ...................... H01J 37/28
10,043,261 B2 * 8/2018 Bhaskar .................. G06T 7/001
(Continued)

FOREIGN PATENT DOCUMENTS

CN   102736280 A   10/2012
CN   103257465 A   8/2013
(Continued)

OTHER PUBLICATIONS

First Office Action in counterpart Chinese Application No. 201811588242.1, dated Mar. 19, 2020.
(Continued)

*Primary Examiner* — Samir A Ahmed

(57) ABSTRACT

Disclosed are a polarizer attachment detection method and device, and a display device. The polarizer attachment detection method includes: controlling an image collection device to collect image data after attachment of a polarizer in a current detection mode; in response to the image data in the current detection mode failing to match prestored standard image data, switching to a next detection mode, controlling the image collection device to collect image data after the attachment of the polarizer in the next detection mode, and marking the image data collected in the next detection mode as new image data; in response to the new image data matching the prestored standard image data, outputting result information that the attachment is correct; and in response to the new image data failing to match the
(Continued)

prestored standard image data, outputting result information that the attachment is incorrect.

16 Claims, 6 Drawing Sheets

(56) References Cited

U.S. PATENT DOCUMENTS

| | | | | |
|---|---|---|---|---|
| 10,186,026 | B2* | 1/2019 | Karsenti | G06F 18/2453 |
| 2014/0219544 | A1* | 8/2014 | Wu | H01L 22/34 |
| | | | | 382/149 |
| 2016/0025648 | A1* | 1/2016 | Duffy | H01J 37/28 |
| | | | | 250/306 |
| 2016/0321800 | A1* | 11/2016 | Thattaisundaram | |
| | | | | G01N 21/95607 |
| 2017/0140524 | A1* | 5/2017 | Karsenti | G06F 18/214 |
| 2017/0200265 | A1* | 7/2017 | Bhaskar | G03F 1/86 |

FOREIGN PATENT DOCUMENTS

| | | |
|---|---|---|
| CN | 103439339 A | 12/2013 |
| CN | 103645573 A | 3/2014 |
| CN | 104316541 A | 1/2015 |
| CN | 105182576 A | 12/2015 |
| CN | 106537125 A | 3/2017 |
| CN | 107272234 A | 10/2017 |
| CN | 109782459 A | 5/2019 |
| JP | 2003232613 A | 8/2003 |
| JP | 2004077261 A | 3/2004 |
| JP | 2004233184 A | 8/2004 |

OTHER PUBLICATIONS

International Search Report in corresponding PCT Application No. PCT/CN2019/123629, dated Mar. 9, 2020 and Written Opinion of the International Searching Authority in corresponding PCT Application No. PCT/CN2019/123629, dated Mar. 9, 2020.

* cited by examiner

POLARIZER ATTACHMENT DETECTION METHOD AND DEVICE, AND DISPLAY DEVICE

CROSS-REFERENCE TO RELATED APPLICATIONS

The present disclosure is the National Stage of International Application No. PCT/CN2019/123629, filed on Dec. 6, 2019, which claims priority to Chinese Patent Application No. 201811588242.1, filed Dec. 24, 2018 with the National Intellectual Property Administration and entitled "POLARIZER ATTACHMENT DETECTION METHOD AND DEVICE, AND DISPLAY DEVICE", the entirety of which is hereby incorporated herein by reference for all purposes.

FIELD

The present disclosure relates to the field of display, and more particularly relates to a polarizer attachment detection method and device, and a display device.

BACKGROUND

The statements here only provide background information related to this application, and do not necessarily constitute prior art.

A liquid crystal display panel works on the principle of controlling rotation of liquid crystal molecules in a liquid crystal layer by applying a driving voltage on two glass substrates, and reflecting light emitted from a backlight source, so as to produce images. In regards to this, polarizer attachment is an important process. The polarizer is attached to the surface of the glass substrate. The polarizer controls the light to pass in a specific direction, and by using optical rotation effect of liquid crystal on polarized light, lets the light to selectively pass through, whereby allowing the liquid crystal display panel to display different images. In the existing polarizer attachment detection, an image to be detected is compared with an image stored in a system. If there exists a mismatch, the result is determined to be incorrect and an alarm is issued. As the color/concentration/contrast and other factors affecting the image change, the captured image may not match the stored image, which causes misjudgment in the detection result.

The above-mentioned polarizer attachment detection way is single, and since the detection result is affected by parameters of the polarizer itself (such as differences in the chromaticity, density and/or contrast), the polarizer attachment detection is likely to be misjudged, which has poor accuracy and low efficiency.

SUMMARY

The present disclosure provides a polarizer attachment detection method, a polarizer attachment detection device and a display device, aiming to prevent misjudgment in polarizer attachment detection.

In one aspect, the present disclosure provides a polarizer attachment detection method, including the following operations:

controlling an image collection device to collect image data after attachment of a polarizer, where the image data is collected in a current detection mode;

in response to the image data in the current detection mode failing to match prestored standard image data, switching to a next detection mode, controlling the image collection device to collect image data after the attachment of the polarizer in the next detection mode, and marking the image data collected in the next detection mode as new image data, where the prestored standard image data is image data that the attachment of the polarizer is correct;

in response to the new image data matching the prestored standard image data, outputting result information that the attachment is correct; and in response to the new image data failing to match the prestored standard image data, outputting result information that the attachment is incorrect.

In another aspect, the present disclosure provides a polarizer attachment detection device, including: a memory, a processor and a computer program stored in the memory and executable by the processor, the computer program when being executed by the processor performing the operations of the method described above.

In still another aspect, the present disclosure provides a display device, including a display panel and the polarizer attachment detection device described above.

In accordance with the present disclosure, by setting a plurality of detection modes, in case where the image data after the attachment of the polarizer captured in one detection mode fails to match the prestored standard image data, the one detection mode may be switched to the next detection mode, whereby preventing the detection result from being determined to be incorrect only after one detection. In addition, such plurality of detection modes can avoid differences in the captured image caused by differences in color, concentration and/or contrast, which increases accuracy of the polarizer attachment detection, reduces probability of false alarms, thereby improving detection efficiency.

The realizing of the aim, functional characteristics and advantages of the present disclosure are further described in detail with reference to the accompanying drawings and the embodiments.

DETAILED DESCRIPTION OF EMBODIMENTS

It will be appreciated that the specific embodiments described herein are merely illustrative of the present disclosure and are not intended to limit the present disclosure.

A solution provided in an embodiment according to the present disclosure includes: controlling an image collection device to collect image data after attachment of a polarizer, where the image data is collected in a current detection mode; in response to the image data in the current detection mode failing to match prestored standard image data, switching to a next detection mode, controlling the image collection device to collect image data after the attachment of the polarizer in the next detection mode, and marking the image data collected in the next detection mode as new image data; in response to the new image data matching the prestored standard image data, outputting result information that the attachment is correct; and in response to the new image data failing to match the prestored standard image data, outputting result information that the attachment is incorrect.

The existing polarizer attachment detection way is single, and since the detection result is affected by the parameters of the polarizer itself (such as differences in chromaticity, density, and/or contrast), the polarizer attachment detection is likely to be misjudged, which has poor accuracy and low efficiency. The present disclosure provides the solution.

Figure 1:
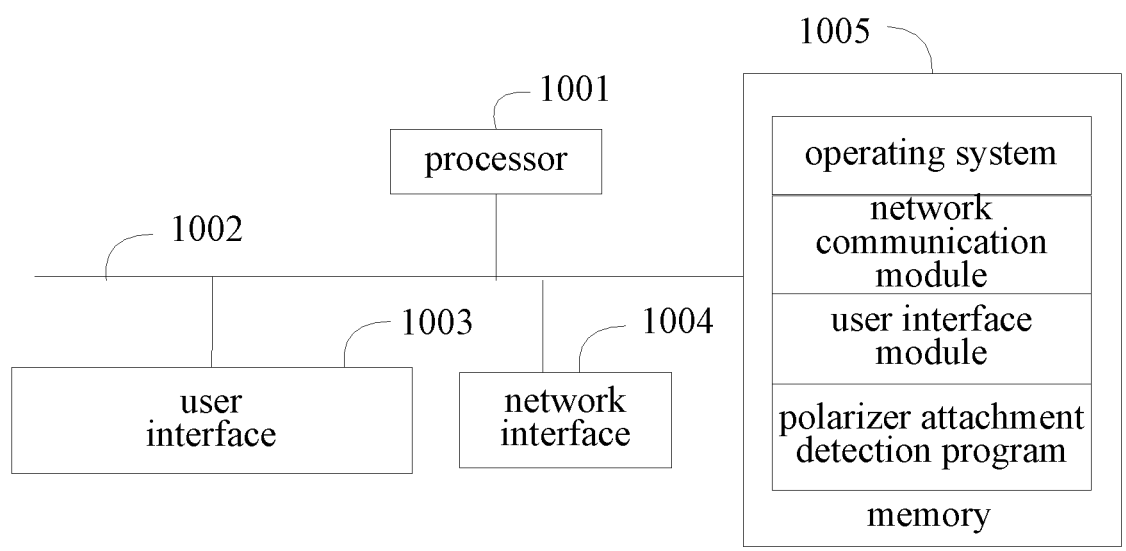
FIG. 1 is a schematic diagram of a display device in a hardware operating environment according to an embodiment of the present disclosure.

FIG. 1 is a schematic diagram of a display device in a hardware operating environment according to an embodiment of this disclosure.

As shown in FIG. 1, the display device may include: a processor 1001, such as central processing unit (CPU), a network interface 1004, a user interface 1003, a memory 1005, and a communication bus 1002. The communication bus 1002 is configured to facilitate connection and communication between these components. The user interface 1003 may include a display, an input unit such as a keyboard, and an optional user interface 1003 may also include a standard wired interface and wireless interface. The network interface 1004 may optionally include a standard wired interface, and a wireless interface (such as a WI-FI interface). The memory 1005 may be a high-speed RAM memory, or a non-volatile memory such as a disk memory. The memory 1005 optionally may also be a storage device that is separate from the processor 1001 described above.

Optionally, the display device may also include a camera, a Radio Frequency (RF) circuit, a sensor, an audio circuit, a WiFi module, a detector (an attachment detector) and so on.

Those skilled in the art can understand that the structure of the terminal shown in FIG. 1 does not constitute a limitation on the display device. Thus, the display device may include more or less components than those illustrated, or some components to be combined, or different arrangements of components. The display device may be, for example, a liquid crystal display device, or a device with a display function and/or a processing function, such as a mobile phone, a pad, or a television.

As shown in FIG. 1, the memory 1005 as a computer storage medium may include an operating system, a network communication module, a user interface module and a polarizer attachment detection program.

In the display device shown in FIG. 1, the network interface 1004 is configured to connect a background server and communicate data with the background server; the user interface 1003 is mainly configured to connect the client (user side) and communicate data with the client; and the processor 1001 may be configured to execute the program stored in the memory 1005 and perform the following steps:

controlling an image collection device to collect image data after attachment of a polarizer, where the image data is collected in a current detection mode;

in response to the image data in the current detection mode failing to match prestored standard image data, switching to a next detection mode, controlling the image collection device to collect image data after the attachment of the polarizer in the next detection mode, and marking the image data collected in the next detection mode as new image data;

in response to the new image data matching the prestored standard image data, outputting result information that the attachment is correct; and in response to the new image data failing to match the prestored standard image data, outputting result information that the attachment is incorrect.

Optionally, the detection modes include one next detection mode, and the next detection mode is a first detection mode; the processor 1001 is configured to call the program stored in the memory 1005 and perform the following steps:

switching to the first detection mode, controlling the image collection device to collect image data after the attachment of the polarizer in the first detection mode, and marking the image data collected in the first detection mode as the new image data.

By setting the one next detection mode as the first detection mode, whether the attachment is correct can be detected in different detection modes, thereby improving detection accuracy.

Optionally, the detection modes include two next detection modes, and the two next detection modes are a first detection mode and a second detection mode, respectively; the processor 1001 is configured to call the program stored in the memory 1005 and perform the following steps:

switching to the first detection mode, controlling the image collection device to collect image data after the attachment of the polarizer in the first detection mode;

and in response to the image data collected in the first detection mode failing to match the prestored standard image data, switching from the first detection mode to the second detection mode, controlling the image collection device to collect image data after the attachment of the polarizer in the second detection mode, and marking the image data collected in the second detection mode as the new image data.

By setting detection modes, different detection environment is provided, which can avoid that the attachment is determined to be incorrect only after one or two detections.

Optionally, after the step of controlling the image collection device to collect image data after the polarizer is attached in the current detection mode, the processor 1001 is configured to call the program stored in the memory 1005 and perform the following steps:

obtaining attribute information of the polarizer; and determining a detection mode associated with the attribute information, and taking the determined detection mode as the next detection mode.

Herein is provided a way to determine the next detection mode, making it possible to accurately switch to the detection mode in which the attachment can be correctly detected.

Optionally, the processor 1001 is configured to call the program stored in the memory 1005 and perform the following steps:

in response to the image data in the current detection mode failing to match the prestored standard image data, calculating a difference between the image data in the current detection mode and the prestored standard image data; and determining a detection mode associated with the difference, and taking the determined detection mode as the next detection mode.

Herein is provided a way to determine the next detection mode, making it possible to accurately switch to the detection mode in which the attachment can be correctly detected.

Optionally, after the step of in response to the image data in the current detection mode failing to match the prestored standard image data, calculating a difference between the image data in the current detection mode and the prestored standard image data, the processor 1001 is configured to call the program stored in the memory 1005 and perform the following steps:

adjusting a collection parameter of the image collection device according to the difference.

By adjusting the collection parameter of the image collection device, the image data collected is different, so that a correct judgment can be made without switching the detection mode. This provides a different solution for improving the accuracy of detection.

Optionally, before the step of controlling the image collection device to collect image data after the polarizer is attached in the current detection mode, the processor 1001 is configured to call the program stored in the memory 1005 and perform the following steps:

determining an attribute parameter of a polarizer currently to be detected;

comparing the attribute parameter of the polarizer currently to be detected with an attribute parameter of a previous polarizer whose detection result is correct; and in response to a comparison result being a match, determining the detection mode of the previous polarizer whose detection result is correct as the current detection mode, and detecting the polarizer currently to be detected in the detection mode of the previous polarizer whose detection result is correct.

The previous detection mode that the detection result is correct can be determined, which simplifies the process of determining the detection mode, thereby improving efficiency.

Optionally, after the step of comparing the attribute parameter of the polarizer currently to be detected with an attribute parameter of a previous polarizer whose detection result is correct, the processor 1001 is configured to call the program stored in the memory 1005 and perform the following steps:

in response to a comparison result being a mismatch, detecting the polarizer currently to be detected in a detection mode other than the detection mode of the previous polarizer whose detection result is correct. The previous detection mode that the detection result is correct can be determined, which simplifies the process of determining the detection mode, thereby improving efficiency.

Optionally, different detection modes correspond to polarizers of different manufacturers.

Optionally, a parameter of a polarizer of a same manufacturer exceeds a certain range, a different detection mode is set for the polarizer of the same manufacturer.

Optionally, before the step of controlling an image collection device to collect image data after the attachment of the polarizer, where the image data is collected in a current detection mode, the processor 1001 is configured to call the program stored in the memory 1005 and perform the following steps:

detecting an environmental parameter of capture;

in response to the environmental parameter failing to match a set standard environmental parameter, adjusting the environmental parameter to match the standard environmental parameter; and capturing the image data after the polarizer is attached. By adjusting the environmental parameter, the image data collected can be more accurate, which avoids environmental factors leading to deviations in the detection result, thereby improving the accuracy of the detection.

Figure 2:
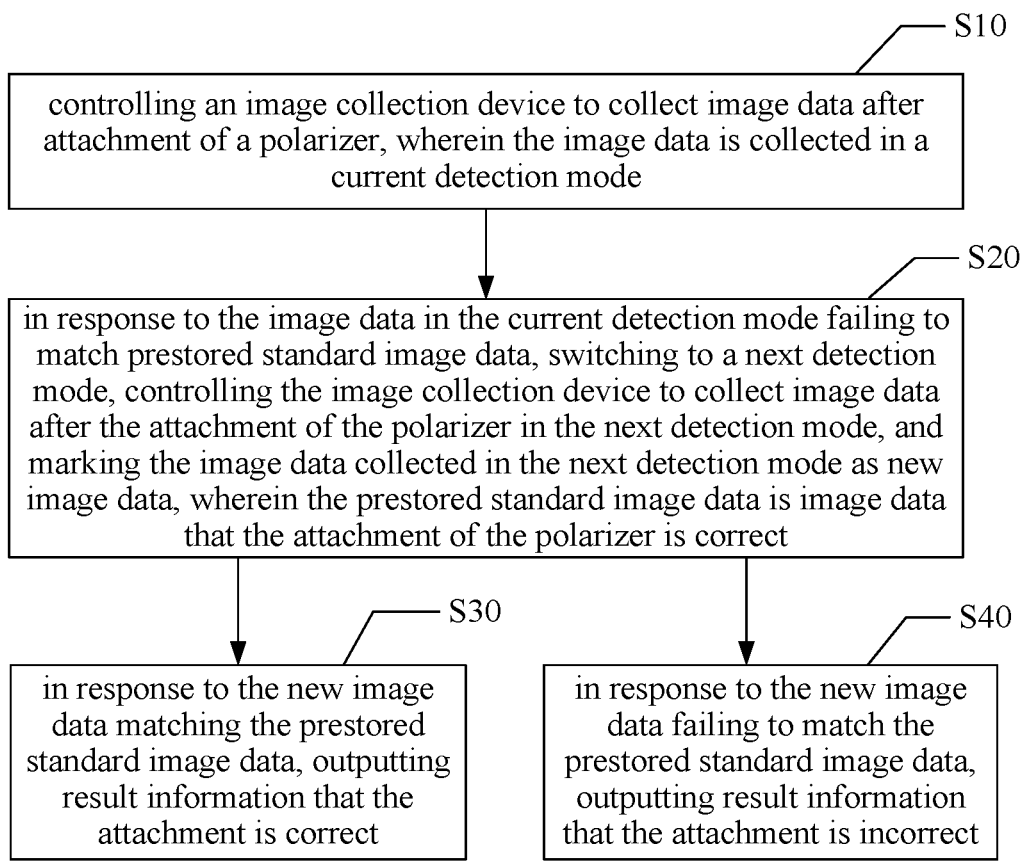
FIG. 2 is an illustrative flowchart of an embodiment of a polarizer attachment detection method according to the present disclosure.

Please refer to FIG. 2, a polarizer attachment detection method is provided in an embodiment according to the present disclosure, including the following steps:

Step S10, controlling an image collection device to collect image data after attachment of a polarizer, where the image data is collected in a current detection mode.

In this embodiment, a detection system of a detection device is used to detect the polarizer attachment to ensure the correctness of the polarizer attachment. A camera is used to capture an image of an attached polarizer and a display panel. The image is compared with a standard image prestored in the system. If the two are matched, it indicates that the attachment is correct; if the two are not matched, it indicates that the attachment is incorrect. The standard image is a prestored image that the polarizer is attached correctly. By the image, the polarizer can perform well, to enable the display panel to realize expected display effect.

Specifically, the detection system of the detection device captures an image of a corner area of a black matrix of the display panel and an edge of the polarizer by using the camera for determining correctness of the attachment. That is, the captured image of the corner area of the black matrix of the display panel and the edge of the polarizer is compared with the standard image stored in the system. The corner area is an area within a preset range from a vertex of the corner, and the preset range may be a radius of 1 mm or 5 mm, or be other ranges, such as 1 mm to 15 mm.

Since there exist multiple manufacturers of polarizers, the polarizers provided by the multiple manufacturers may have differences in color, density, and/or contrast. According to this, different detection modes are set for the polarizers of the multiple manufacturers, so as to overcome these differences.

In case where polarizer attachment needs to be detected, the image collection device is controlled to collect the image data after the attachment of the polarizer in the current detection mode. The image data after the attachment of the polarizer is collected in the current mode.

Step S20, in response to the image data in the current detection mode failing to match prestored standard image data, switching to a next detection mode, controlling the image collection device to collect image data after the attachment of the polarizer in the next detection mode, and marking the image data collected in the next detection mode as new image data, where the prestored standard image data is image data that the attachment of the polarizer is correct.

The prestored standard image data is image data that the polarizer is attached correctly in the current detection mode. If the image data captured in the current detection mode matches the prestored standard image data, the attachment is determined to be correct; if the image data in the current detection mode does not match the prestored standard image data, the current detection mode is switched to the next detection mode, the image collection device is controlled to collect the image data after the attachment of the polarizer in the next detection mode, and the imaged data collected in the next detection mode is marked as new image data. The system stores different detection modes, and the different detection modes correspond to polarizers of different manufacturers. Alternatively or optionally, one detection mode is set for polarizers of a same production batch of one manufacturer; or, in case where the parameters of the polarizers of the same manufacturer (chromaticity, density and/or contrast) exceed a certain range value, different detection modes are set for the polarizers of the same manufacturer with large differences (for example, the contrast is greater than 5% or 8%). In response to the mismatch, the current detection mode is switched to the next detection mode, then the image data after the attachment of the polarizer is collected in this mode and marked as the new image data. The image data captured in the next detection mode may correspond to different standard image data that have been preset. That is, the different detection modes correspond to the different standard image data, which aims to represent the image data of the correct attachment.

Step S30, in response to the new image data matching the prestored standard image data, outputting result information that the attachment is correct.

Step S40, in response to the new image data failing to match the prestored standard image data, outputting result information that the attachment is incorrect.

If the new image data matches the prestored standard image data, that is, if the new image data matches the standard image data in the corresponding detection mode, the result information that the attachment of the polarizer is correct is output. If the new image data mismatches the prestored standard image data, the result information that the attachment of the polarizer is incorrect is output. In the existing technology, if there exists mismatch in one detection mode, the attachment is determined to be incorrect. However, according to the embodiment, if there exists mismatch in one detection mode, then after switching to another detection mode, the detection is reperformed, instead of determining that the attachment of the polarizer is incorrectly only by one detection.

Figure 3:
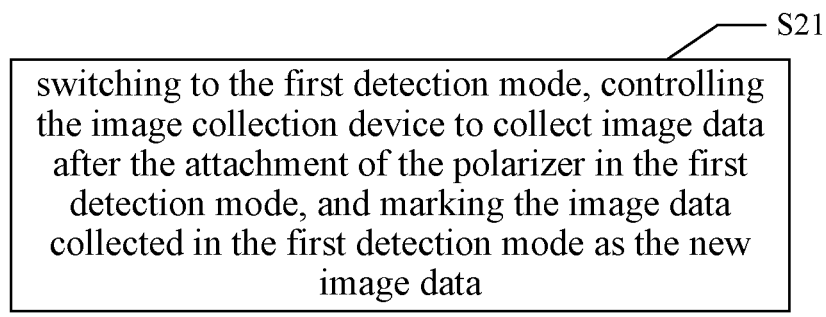
FIG. 3 is an illustrative flowchart of switching to a next detection mode, and controlling the image collection device to collect image data after the attachment of the polarizer in the next detection mode in an embodiment according to the present disclosure.

Optionally, referring to FIG. 3, the detection modes include one next detection mode, and the next detection mode is a first detection mode. The step of switching to a next detection mode, controlling the image collection device to collect image data after the polarizer is attached in the next detection mode includes:

Step S21, switching to the first detection mode, controlling the image collection device to collect image data after the attachment of the polarizer in the first detection mode, and marking the image data collected in the first detection mode as the new image data.

In accordance with this, if there exists mismatch in one detection mode, and there exists match in the next detection mode, then the attachment is determined to be correct. If there exists mismatches in both detection modes, then the attachment is determined to be incorrect.

Figure 4:
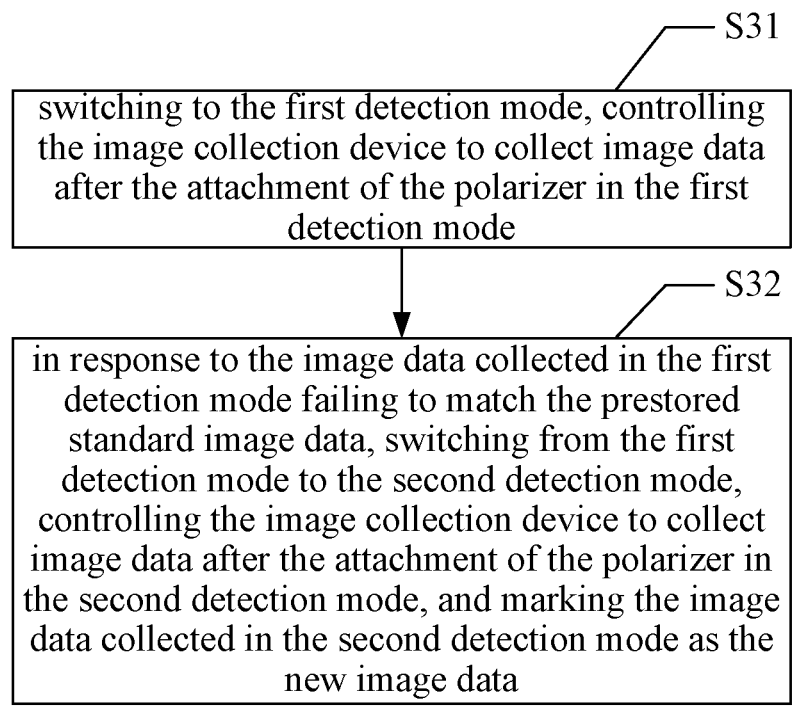
FIG. 4 is an illustrative flowchart of switching to a next detection mode, and controlling the image collection device to collect image data after the attachment of the polarizer in the next detection mode in another embodiment according to the present disclosure.

Optionally, referring to FIG. 4, the detection modes include two next detection modes, and the two next detection modes are a first detection mode and a second detection mode, respectively. The step of switching to a next detection mode, controlling the image collection device to collect image data after the polarizer is attached in the next detection mode includes:

Step S31, switching to the first detection mode, controlling the image collection device to collect image data after the attachment of the polarizer in the first detection mode.

Step S32, in response to the image data collected in the first detection mode failing to match the prestored standard image data, switching from the first detection mode to the second detection mode, controlling the image collection device to collect image data after the attachment of the polarizer in the second detection mode, and marking the image data collected in the second detection mode as the new image data.

In accordance with this, the attachment is determined to be incorrect only when there exists mismatches in the three detection modes; while if there exists match in any one of the three detection modes, the attachment is determined to be correct. Herein, the number of the detection modes is not limited to three, and it may be larger than three. If there exists mismatch, it continues to switch to another unswitched detection mode and then recapture image data. It will be appreciated that, in order to save process, the image may be captured only in the first detection mode, and after this, it is adjusted with reference to the standard image data. The first detection mode may be the one shown in FIG. 3, and may also be other detection modes. Herein, the first detection mode and the second detection mode are merely for distinguishing two different detection modes.

In an embodiment, in response to the mismatch, an environment parameter affecting the captured image, such as ambient light source, is detected. If the environment parameter does not match a set standard environment parameter or a difference between the two is large (for example, a difference in light intensity is larger than a preset value), the environmental parameter needs to be adjusted to match the standard environmental parameter, and the image data after the attachment of the polarizer is re-captured, so as to ensure the correctness of the captured image. After that, whether the captured imaged data matches the prestored standard image data is determined, thereby improving detection accuracy.

According to this embodiment, by setting a plurality of detection modes, in case where the image data after the attachment of the polarizer captured in one detection mode fails to match the prestored standard image data, the current detection mode is switched to the next detection mode, whereby preventing the detection result from being determined to be incorrect only after one detection. In addition, such plurality of detection modes can avoid differences in the captured image caused by differences in color, concentration and/or contrast, which increases accuracy of polarizer attachment detection, reduces probability of false alarms, thereby improving detection efficiency.

Figure 5:
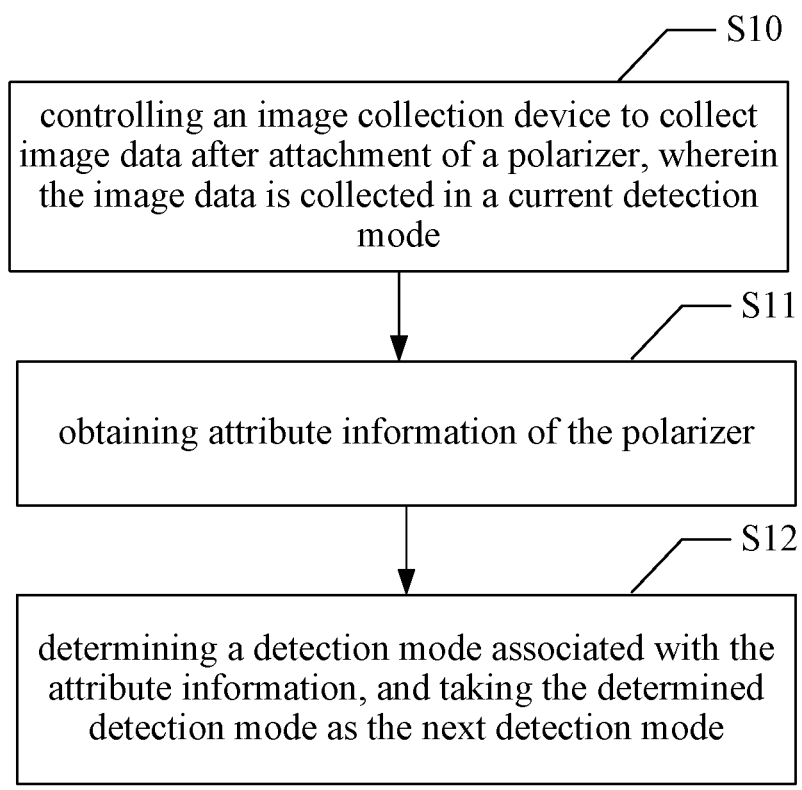
FIG. 5 is an illustrative flowchart of another embodiment of a polarizer attachment detection method according to the present disclosure.

In an embodiment, referring to FIG. 5, after controlling the image collection device to collect image data after the attachment of the polarizer in the current detection mode, the method further includes:

Step S11, obtaining attribute information of the polarizer.

Step S12, determining a detection mode associated with the attribute information, and taking the determined detection mode as the next detection mode.

In an embodiment, in order to improve the efficiency as to determining the detection mode, and avoid randomly switching to the next detection mode, after capturing the image data in the current detection mode, the attribute information of the polarizer is obtained if the attachment is determined to be incorrect. The attribute information may be manufacturer information or batch information of the polarizer. The detection mode associated with the attribute information is determined according to a mapping relationship between the attribute information and the detection mode. Then the determined detection mode is used as the next detection mode. This avoids the inability to accurately switch to the required detection mode at one time due to random switching, thereby improving efficiency and saving costs.

Figure 6:
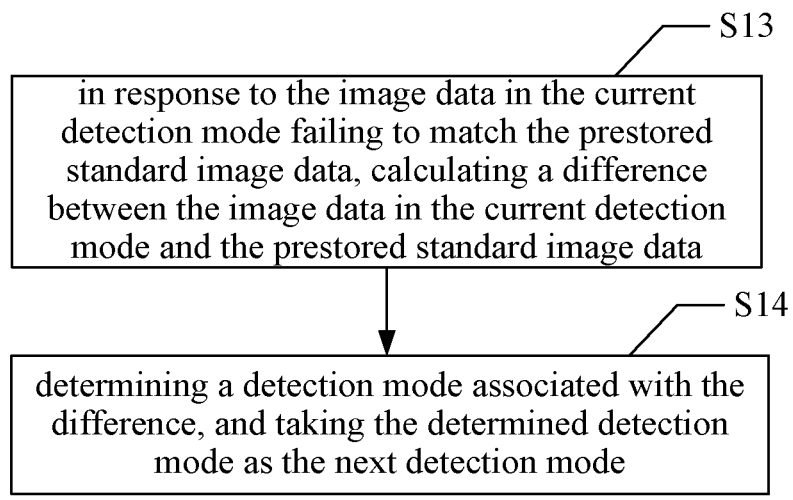
FIG. 6 is an illustrative flowchart of determining a next detection mode in an embodiment according to the present disclosure.

In an embodiment, referring to FIG. 6, the step of determining the next detection mode may include:

Step S13, in response to the image data in the current detection mode failing to match the prestored standard image data, calculating a difference between the image data in the current detection mode and the prestored standard image data.

Step S14, determining a detection mode associated with the difference, and taking the determined detection mode as the next detection mode.

According to the difference between the captured image data and the standard image data in the current detection mode, the detection mode associated with this difference in the set detection modes is determined as the next detection mode, which enables accurate determination of the detection mode. In addition, according to the difference, collection parameters of the collection device may be adjusted, for example, the angle or the light intensity. In an embodiment, following the above described manner, the detection mode may be determined by capturing an image or obtaining the attribute information of the polarizer before the detection, which improves the detection efficiency. The mapping relationship between the image data difference and the detection mode is set in advance, such that the detection mode corresponding to the difference can be directly queried according to the mapping relationship.

Figure 7:
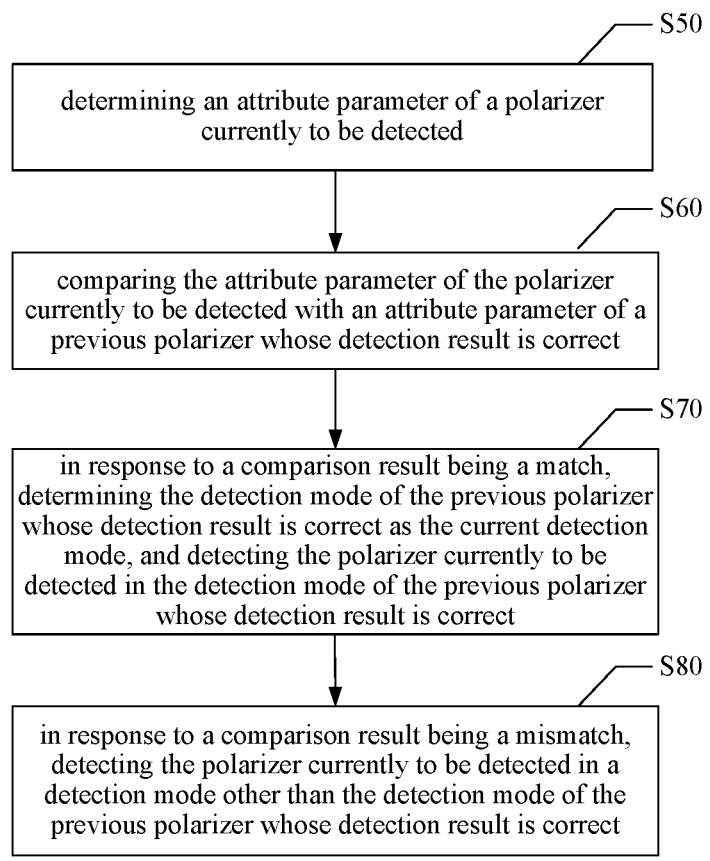
FIG. 7 is an illustrative flowchart of still another embodiment of a polarizer attachment detection method according to the present disclosure.

In an embodiment, referring to FIG. 7, before the step of controlling the image collection device to collect image data after the attachment of the polarizer in the current detection mode, the method further includes:

Step S50, determining an attribute parameter of the polarizer currently to be detected.

Step S60, comparing the attribute parameter of the polarizer currently to be detected with an attribute parameter of a previous polarizer whose detection result is correct.

Step S70, in response to a comparison result being a match, determining the detection mode of the previous polarizer whose detection result is correct as the current detection mode, and detecting the polarizer currently to be detected in the detection mode of the previous polarizer whose detection result is correct.

Step S80, in response to the comparison result being a mismatch, detecting the polarizer currently to be detected in a detection mode other than the detection mode of the previous polarizer whose detection result is correct.

Before detecting whether the polarizer of the display panel is attached correctly, the attribute parameters of the polarizer currently to be detected are determined, such as the color, density and/or contrast of the polarizer currently to be detected. The attribute parameters of the polarizer that is attached correctly are obtained, and then compared with the attribute parameters of the polarizer currently to be detected. If the two are matched, the detection mode that the detection result is correct can be quickly determined and used for the detection of the polarizer currently to be detected; if the two are mismatched, the detection is controlled to be performed in another detection mode, such that the number of the detection modes to be switched is reduced by one, thereby improving the efficiency.

In addition, a polarizer attachment detection device is provided in an embodiment according to the present disclosure, including: a memory, a processor, and a computer program stored in the memory and executable by the processor, the computer program when being executed by the processor performing the steps of the method according to the above-mentioned embodiments. The polarizer attachment detection device further includes a collection device, a recognition device, and an alarm device. The collection device and the alarm device are both connected to the recognition device. The detection device may further include a display panel transmission device. The transmission device is provided with a sensor. In response to the sensor detecting a signal, the collection device captures an image and transmits the image to the recognition device. The recognition device outputs a recognition result for the alarm device. According to the detection result, in response to the mismatch, the recognition device controls to switch the mode and re-detect, so as to avoid misjudgment caused by the difference of the color, density and/or contrast of the polarizer itself in one detection.

In accordance with the detection device in the embodiment, by setting a plurality of detection modes, in case where the image data after the attachment of the polarizer captured in one detection mode fails to match the prestored standard image data, the one detection mode may be switched to the next detection mode, whereby preventing the detection result from being determined to be incorrect only by one detection. In addition, such plurality of detection modes can avoid differences in the captured image caused by differences in color, concentration and/or contrast, which increases accuracy of polarizer attachment detection, reduces probability of false alarms, thereby improving detection efficiency.

In addition, a display device is provided in an embodiment according to the present disclosure, including a display panel and the polarizer attachment detection device as described above. A display component of the display device is connected to the polarizer attachment detection device, configured for displaying the detection result and prompting information.

In addition, a computer readable storage medium is provided in an embodiment according to the present disclosure. The a computer readable storage medium stores a polarizer attachment detection program, the polarizer attachment detection program when being executed by a processor performing the steps of the method according to the above-mentioned embodiments.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

The numbers of the embodiments according to the present disclosure are merely for description, and do not represent for the advantages and disadvantages of the embodiments.

According to the description of the above-mentioned embodiments, the skilled in the art can clearly understand that the method of embodiments above may be implemented by means of software plus a necessary general hardware platform, of course, also by means of hardware, but in many cases the former is a better implementation. Based on the understanding, the technical solution of the present disclosure can be embodied in the form of a software product in essence or in part contributing to the prior art. The software product is stored in a storage medium (such as a ROM/ RAM, a magnetic disk, an optical disk) as described above, including a plurality of instructions for causing a terminal device (which may be a mobile phone, a computer, a server, an air conditioner, or a network device, and so on.) to execute the method described in various embodiments according to the present disclosure.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A polarizer attachment detection method, comprising:
controlling an image collection device to collect image data displayed by the display device after attachment of a polarizer to a surface of the glass substrate in a current detection mode;
comparing the image data in the current detection mode to prestored standard image data;
in response to the image data in the current detection mode failing to match the prestored standard image data, switching to a next detection mode, controlling the image collection device to collect new image data after the attachment of the polarizer in the next detection mode, wherein the prestored standard image data is image data that the attachment of the polarizer is correct;
comparing the new image data to the prestored standard image data;
in response to the new image data matching the prestored standard image data, outputting result information that the attachment is correct; and
in response to the new image data failing to match the prestored standard image data, outputting result information that the attachment is incorrect;
wherein a parameter of a polarizer of a same manufacturer exceeds a certain range, a different detection mode is set for the polarizer of the same manufacturer.

2. The polarizer attachment detection method according to claim 1, wherein detection modes comprise one next detection mode, the next detection mode is a first detection mode; the operation of switching to the next detection mode, controlling the image collection device to collect image data after the attachment of the polarizer in the next detection mode comprises:
switching to the first detection mode, controlling the image collection device to collect image data after the attachment of the polarizer in the first detection mode, and marking the image data collected in the first detection mode as the new image data.

3. The polarizer attachment detection method according to claim 2, wherein before the operation of controlling the image collection device to collect image data after attachment of the polarizer in the current detection mode, the polarizer attachment detection method further comprises:
determining an attribute parameter of a polarizer currently to be detected;
comparing the attribute parameter of the polarizer currently to be detected with an attribute parameter of a previous polarizer whose detection result is correct; and
in response to a comparison result being a match, determining the detection mode of the previous polarizer whose detection result is correct as the current detection mode, and detecting the polarizer currently to be detected in the detection mode of the previous polarizer whose detection result is correct.

4. The polarizer attachment detection method according to claim 2, wherein after the operation of controlling an image collection device to collect image data after attachment of the polarizer in the current detection mode, the polarizer attachment detection method further comprises:
obtaining attribute information of the polarizer; and
determining a detection mode associated with the attribute information, and taking the determined detection mode as the next detection mode.

5. The polarizer attachment detection method according to claim 1, wherein the detection modes comprise two next detection modes, the two next detection modes are a first detection mode and a second detection mode, respectively; the operation of switching to a next detection mode, controlling the image collection device to collect image data after the attachment of the polarizer in the next detection mode comprises:
switching to the first detection mode, controlling the image collection device to collect image data after the attachment of the polarizer in the first detection mode; and
in response to the image data collected in the first detection mode failing to match the prestored standard image data, switching from the first detection mode to the second detection mode, controlling the image collection device to collect image data after the attachment of the polarizer in the second detection mode, and marking the image data collected in the second detection mode as the new image data.

6. The polarizer attachment detection method according to claim 5, wherein before the operation of controlling an image collection device to collect image data after attachment of the polarizer in the current detection mode, the polarizer attachment detection method further comprises:
determining an attribute parameter of a polarizer currently to be detected;
comparing the attribute parameter of the polarizer currently to be detected with an attribute parameter of a previous polarizer whose detection result is correct; and
in response to a comparison result being a match, determining the detection mode of the previous polarizer whose detection result is correct as the current detection mode, and detecting the polarizer currently to be detected in the detection mode of the previous polarizer whose detection result is correct.

7. The polarizer attachment detection method according to claim 5, wherein after the operation of controlling an image collection device to collect image data after attachment of the polarizer in the current detection mode, the polarizer attachment detection method further comprises:
obtaining attribute information of the polarizer; and
determining a detection mode associated with the attribute information, and taking the determined detection mode as the next detection mode.

8. The polarizer attachment detection method according to claim 1, wherein after the operation of controlling an image collection device to collect image data after attachment of the polarizer in the current detection mode, the polarizer attachment detection method further comprises:
obtaining attribute information of the polarizer; and
determining a detection mode associated with the attribute information, and taking the determined detection mode as the next detection mode.

9. The polarizer attachment detection method according to claim 1, further comprising:
in response to the image data in the current detection mode failing to match the prestored standard image data, calculating a difference between the image data in the current detection mode and the prestored standard image data; and determining a detection mode associated with the difference, and taking the determined detection mode as the next detection mode.

10. The polarizer attachment detection method according to claim 9, wherein after the operation of in response to the image data in the current detection mode failing to match the prestored standard image data, calculating a difference between the image data in the current detection mode and the prestored standard image data, the polarizer attachment detection method further comprises:

adjusting a collection parameter of the image collection device according to the difference.

11. The polarizer attachment detection method according to claim 1, wherein before the operation of controlling an image collection device to collect image data after attachment of the polarizer in the current detection mode, the polarizer attachment detection method further comprises:

determining an attribute parameter of a polarizer currently to be detected;

comparing the attribute parameter of the polarizer currently to be detected with an attribute parameter of a previous polarizer whose detection result is correct; and in response to a comparison result being a match, determining a detection mode of the previous polarizer whose detection result is correct as the current detection mode, and detecting the polarizer currently to be detected in the detection mode of the previous polarizer whose detection result is correct.

12. The polarizer attachment detection method according to claim 11, wherein after the operation of comparing the attribute parameter of the polarizer currently to be detected with an attribute parameter of a previous polarizer whose detection result is correct, the polarizer attachment detection method further comprises:

in response to the comparison result being a mismatch, detecting the polarizer currently to be detected in a detection mode other than the detection mode of the previous polarizer whose detection result is correct.

13. The polarizer attachment detection method according to claim 1, wherein different detection modes correspond to polarizers of different manufacturers.

14. The polarizer attachment detection method according to claim 1, wherein before the operation of controlling an image collection device to collect image data after attachment of the polarizer in the current detection mode, the polarizer attachment detection method further comprises:

detecting an environmental parameter of capture;

in response to the environmental parameter failing to match a set standard environmental parameter, adjusting the environmental parameter to match the standard environmental parameter; and capturing the image data after the attachment of the polarizer.

15. A polarizer attachment detection device, comprising: a memory, a processor, and a computer program stored in the memory and executable by the processor, the computer program when being executed by the processor performing the following operations:

controlling an image collection device to collect image data displayed by the display device after attachment of a polarizer to a surface of the glass substrate in a current detection mode;

comparing the image data in the current detection mode to prestored standard image data;

in response to the image data in the current detection mode failing to match the prestored standard image data, switching to a next detection mode, controlling the image collection device to collect new image data after the attachment of the polarizer in the next detection mode, wherein the prestored standard image data is image data that the attachment of the polarizer is correct;

comparing the new image data to the prestored standard image data;

in response to the new image data matching the prestored standard image data, outputting result information that the attachment is correct; and in response to the new image data failing to match the prestored standard image data, outputting result information that the attachment is incorrect;

wherein a parameter of a polarizer of a same manufacturer exceeds a certain range, a different detection mode is set for the polarizer of the same manufacturer.

16. A display device, comprising a display panel and a polarizer attachment detection device, the polarizer attachment detection device comprising: a memory, a processor, and a computer program stored in the memory and executable by the processor, the computer program when being executed by the processor performing the following operations:

controlling an image collection device to collect image data displayed by the display device after attachment of a polarizer to a surface of the glass substrate in a current detection mode;

comparing the image data in the current detection mode to prestored standard image data;

in response to the image data in the current detection mode failing to match the prestored standard image data, switching to a next detection mode, controlling the image collection device to collect new image data after the attachment of the polarizer in the next detection mode, wherein the prestored standard image data is image data that the attachment of the polarizer is correct;

comparing the new image data to the prestored standard image data;

in response to the new image data matching the prestored standard image data, outputting result information that the attachment is correct; and in response to the new image data failing to match the prestored standard image data, outputting result information that the attachment is incorrect;

wherein a parameter of a polarizer of a same manufacturer exceeds a certain range, a different detection mode is set for the polarizer of the same manufacturer.

* * * * *